(12) United States Patent
Zamir et al.

(10) Patent No.: US 9,037,581 B1
(45) Date of Patent: *May 19, 2015

(54) PERSONALIZED SEARCH RESULT RANKING

(75) Inventors: Oren Zamir, Los Altos, CA (US);
Jeffrey Korn, New York, NY (US)

(73) Assignee: Google Inc., Mountain View, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 11/536,901

(22) Filed: Sep. 29, 2006

(51) Int. Cl.
*G06F 7/00* (2006.01)
*G06F 17/30* (2006.01)

(52) U.S. Cl.
CPC ............................... *G06F 17/30867* (2013.01)

(58) Field of Classification Search
CPC ..................... G06F 17/30867; G06F 17/30876
USPC .............................................. 707/5, 732, 751
See application file for complete search history.

(56) References Cited

U.S. PATENT DOCUMENTS

| | | | |
|---|---|---|---|
| 5,999,957 A * | 12/1999 | Ohta ............................. | 708/400 |
| 6,285,999 B1 | 9/2001 | Page | |
| 6,370,526 B1 | 4/2002 | Agrawal et al. | |
| 6,421,675 B1 | 7/2002 | Ryan et al. | |
| 6,539,377 B1 * | 3/2003 | Culliss ............................. | 707/5 |
| 6,631,372 B1 | 10/2003 | Graham | |
| 6,718,324 B2 | 4/2004 | Edlund et al. | |
| 6,738,764 B2 | 5/2004 | Mao et al. | |
| 6,993,586 B2 * | 1/2006 | Chen et al. ..................... | 709/228 |
| 7,003,513 B2 * | 2/2006 | Geiselhart ......................... | 707/5 |
| 7,093,012 B2 | 8/2006 | Olstad et al. | |
| 8,548,995 B1 | 10/2013 | Curtiss | |
| 8,762,373 B1 | 6/2014 | Zamir et al. | |
| 2002/0049452 A1 * | 4/2002 | Kurz et al. .................... | 606/127 |
| 2002/0073065 A1 | 6/2002 | Inaba et al. | |
| 2002/0103798 A1 * | 8/2002 | Abrol et al. ...................... | 707/5 |
| 2002/0123988 A1 | 9/2002 | Dean et al. | |
| 2002/0147772 A1 * | 10/2002 | Glommen et al. ............ | 709/203 |
| 2003/0135490 A1 * | 7/2003 | Barrett et al. ..................... | 707/3 |
| 2004/0260688 A1 | 12/2004 | Gross | |
| 2005/0071741 A1 | 3/2005 | Acharya et al. | |
| 2005/0076003 A1 | 4/2005 | DuBose et al. | |
| 2005/0102282 A1 * | 5/2005 | Linden .............................. | 707/3 |
| 2005/0144193 A1 | 6/2005 | Henzinger | |
| 2005/0149502 A1 | 7/2005 | McSherry | |
| 2005/0203888 A1 * | 9/2005 | Woosley et al. .................. | 707/3 |
| 2005/0222981 A1 * | 10/2005 | Lawrence et al. ................ | 707/3 |
| 2005/0234877 A1 * | 10/2005 | Yu ...................................... | 707/3 |
| 2005/0256848 A1 * | 11/2005 | Alpert et al. ...................... | 707/3 |
| 2005/0278317 A1 | 12/2005 | Gross et al. | |
| 2006/0004711 A1 * | 1/2006 | Naam ................................ | 707/3 |

(Continued)

FOREIGN PATENT DOCUMENTS

EP          1 107 128 A1     6/2001

OTHER PUBLICATIONS

Co-pending U.S. Appl. No. 10/748,664, entitled "Information Retrieval Based on Historical Data", Inventors: Anurag Acharya et al., filed Dec. 31, 2003.

(Continued)

*Primary Examiner* — Jeffrey A Burke
(74) *Attorney, Agent, or Firm* — Harrity & Harrity, LLP

(57) ABSTRACT

A system determines a user's past search result selection activity. The system adjusts the ranking of current search results provided to the user based on the user's past search result selection activity.

20 Claims, 11 Drawing Sheets

(56) References Cited

U.S. PATENT DOCUMENTS

| | | | |
|---|---|---|---|
| 2006/0026147 A1* | 2/2006 | Cone et al. | 707/3 |
| 2006/0047643 A1* | 3/2006 | Chaman | 707/3 |
| 2006/0064411 A1 | 3/2006 | Gross et al. | |
| 2006/0074883 A1* | 4/2006 | Teevan et al. | 707/3 |
| 2006/0136377 A1* | 6/2006 | Patt-Shamir et al. | 707/3 |
| 2006/0195443 A1* | 8/2006 | Franklin et al. | 707/5 |
| 2006/0206476 A1 | 9/2006 | Kapur et al. | |
| 2006/0242129 A1* | 10/2006 | Libes et al. | 707/3 |
| 2006/0248055 A1* | 11/2006 | Haslam et al. | 707/3 |
| 2006/0253427 A1* | 11/2006 | Wu et al. | 707/3 |
| 2006/0277167 A1 | 12/2006 | Gross et al. | |
| 2006/0287985 A1 | 12/2006 | Castro et al. | |
| 2007/0005575 A1 | 1/2007 | Dai et al. | |
| 2007/0005587 A1* | 1/2007 | Johnson et al. | 707/5 |
| 2007/0088686 A1* | 4/2007 | Hurst-Hiller et al. | 707/4 |
| 2007/0239702 A1 | 10/2007 | Vassilvitskii et al. | |
| 2007/0260597 A1* | 11/2007 | Cramer | 707/5 |
| 2007/0266025 A1 | 11/2007 | Wagner et al. | |
| 2007/0294225 A1* | 12/2007 | Radlinski et al. | 707/3 |
| 2007/0294615 A1 | 12/2007 | Sathe | |
| 2012/0023098 A1 | 1/2012 | Dean et al. | |
| 2012/0209838 A1 | 8/2012 | Dean et al. | |

OTHER PUBLICATIONS

The International Search Report for corresponding PCT Application No. PCT/US2004/030000 with a mailing date of Feb. 11, 2005, 4 pages, (corresponding to U.S. Appl. No. 10/748,664).

Co-pending U.S. Appl. No. 11/561,625, entitled "Document Scoring Based on Document Inception Date", Inventors: Matt Cutts et al., filed Dec. 7, 2006.

Co-pending U.S. Appl. No. 11/562,285, entitled "Document Scoring Based on Document Content Update", Inventors: Anurag Acharya et al., filed Dec. 7, 2006.

Co-pending U.S. Appl. No. 11/562,617, entitled "Document Scoring Based on Query Analysis", Inventors: Jeffrey Dean et al., filed Dec. 7, 2006.

Co-pending U.S. Appl. No. 11/565,004, entitled "Document Scoring Based on Link-Based Criteria", Inventors: Anurag Acharya et al., filed Nov. 30, 2006.

Co-pending U.S. Appl. No. 11/565,026, entitled "Document Scoring Based on Traffic Associated with a Document", Inventors: Steve Lawrence et al., filed Nov. 30, 2006.

Co-pending U.S. Appl. No. 10/879,503, entitled."Systems and Methods for Determining Document Freshness", Inventors: Monika Henzinger et al., filed Jun. 30, 2004.

The International Search Report for corresponding PCT Application No. PCT/US04/29982 with a mailing date of Nov. 19, 2004, 4 pages (corresponding to U.S. Appl. No. 10/879,503).

Monika Henzinger; "Web Information Retrieval—an Algorithmic Perspective"; Lecture Notes in Computer Science; vol. 1879; 2000; pp. 1-8.

Junyan Ding et al.; "Computing Geographical Scopes of Web Resources"; Proceedings of the 26th VLDB Conference, Cairo Egypt, 2000; 12 pages.

Office Action from U.S. Appl. No. 11/562,617, dated Jun. 9, 2009, 24 pages.

\* cited by examiner

PERSONALIZED SEARCH RESULT RANKING

BACKGROUND

Implementations described herein relate generally to document searching and, more particularly, to using a user's past searching activity to personalize the ranking of later search results presented to the user.

The World Wide Web ("web") contains a vast amount of information. Locating a desired portion of the information, however, can be challenging. This problem is compounded because the amount of information on the web and the number of new users inexperienced at web searching are growing rapidly. Search engines assist users in locating desired portions of this information by cataloging web pages. Typically, in response to a user's request, the search engine returns references to documents relevant to the request.

Generally, search engines may base their determination of the user's interest on search terms (called a search query) entered by the user. The goal of the search engine is to identify links to high quality, relevant results (e.g., web pages) based on the search query. Typically, the search engine accomplishes this by matching the terms in the search query to a corpus of pre-stored documents. Documents that contain the user's search terms are considered "hits" and are returned to the user. The "hits" returned by the search engine may be ranked among one another by the search engine based on some measure of the quality and/or relevancy of the hits. A basic technique for sorting the search hits relies on the degree with which the search query matches the hits. For example, documents that contain every term of the search query or that contain multiple occurrences of the terms in the search query may be deemed more relevant than documents that contain less than every term of the search query or a single occurrence of a term in the search query and, therefore, may be more highly ranked by the search engine.

SUMMARY

According to one aspect, a method may include supplying a first set of search results to a user and tracking the user's selection of search results from the first set of search results. The method may further include obtaining a second set of search results and adjusting a ranking of at least one search result of the second set of search results based on the user's selection of search results from the first set of search results.

According to another aspect, a method may include receiving a search query from a user and searching a corpus of documents to identify search results based on the search query. The method may further include ranking the identified search results based on the user's past selection of search results and providing the ranked search results to the user.

According to a further aspect, a method may include determining a user's past search result selection activity. The method may further include adjusting the ranking of current search results provided to the user based on the user's past search result selection activity.

BRIEF DESCRIPTION OF THE DRAWINGS

The accompanying drawings, which are incorporated in and constitute a part of this specification, illustrate one or more embodiments of the invention and, together with the description, explain aspects of the invention. In the drawings.

DETAILED DESCRIPTION

The following detailed description refers to the accompanying drawings. The same reference numbers in different drawings may identify the same or similar elements. The following detailed description does not limit the invention.

As described herein, a technique for personalizing the ranking of search results provided to a user is provided that learns from a user's past search result selection activity (e.g., past user search result "clicks"). A given user's selection activity, when selecting search results from a set of search results provided to the user by a search engine, may be tracked, and the selection activity may be used in ranking/re-ranking subsequent search results provided to that user. In one implementation, search results, having past selection activity indicating that the user likes these search results, may be boosted among other search results when those search results occur in subsequent searches initiated by the user. Thus, the ranking of search results provided to a given user may be personalized based on that user's past search result selection activity.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document. A "site" as the term is used herein is to be broadly interpreted to include a group of documents hosted by any type of entity. A "site" may include a group of documents under common control, such as a group of documents associated with an organization, a domain name, a host name, or a set of documents created by the same person or group of persons. A "site" may also include a group of documents about a particular topic, a group of documents in a particular language, a group of documents hosted in a particular country, or a group of documents written in a particular writing style.

Overview

Figure 1:
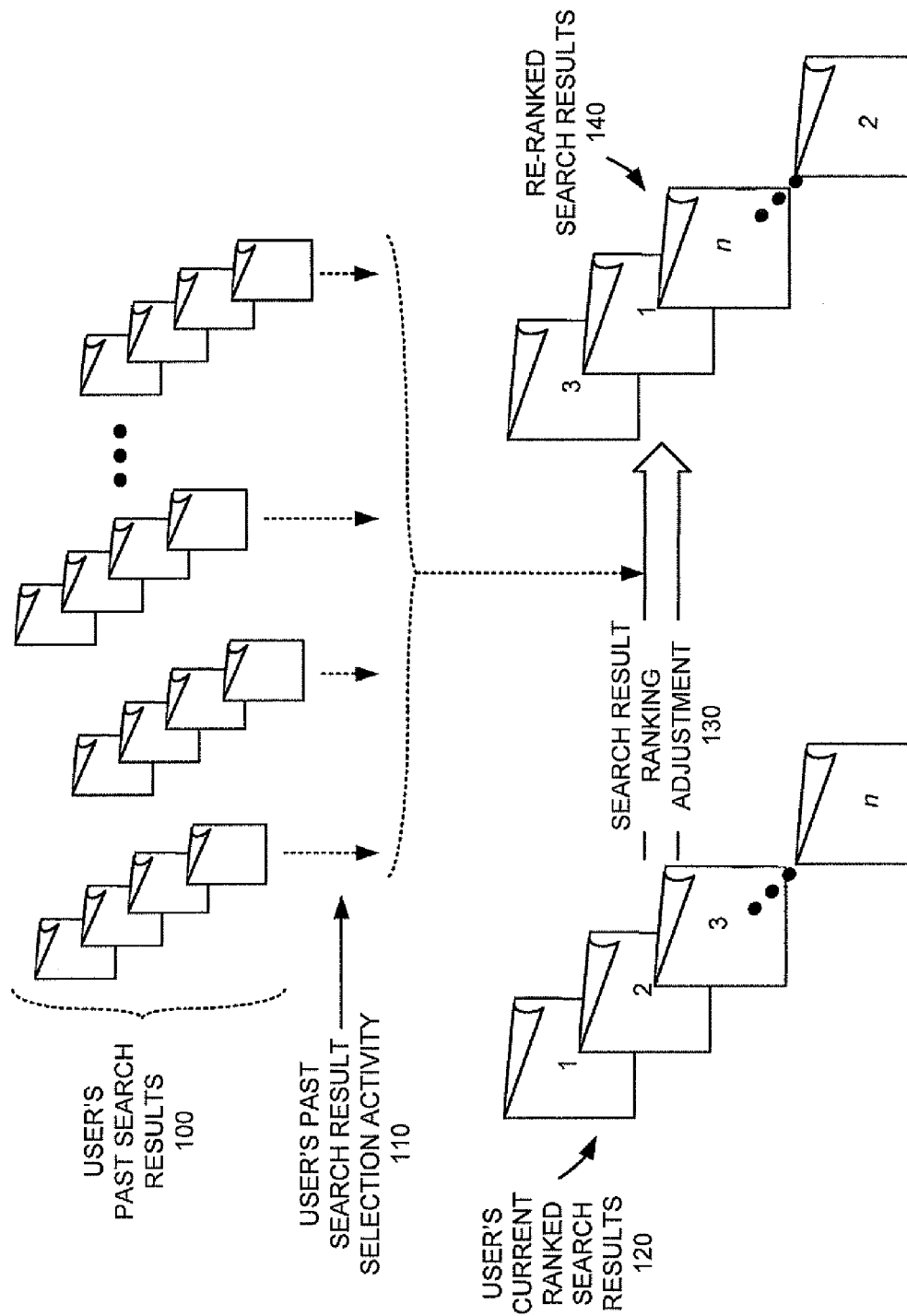
FIG. 1 is an exemplary diagram of an overview of an implementation described herein.

FIG. 1 illustrates an exemplary overview of the tracking of a user's past search result selection activity for use in re-ranking, adjusting the ranking, or boosting the ranking, of subsequent search results provided to the user. As shown in FIG. 1, past search results 100 have been presented to a user by a search engine (not shown), and user activity 110 associated with the user's selections of search results from the past search results 100 have been tracked. The user's past search result selection activity 110 may include, for example, a number of times a user selected a specific document, or any document associated with a specific site. The past search result selection activity 110 may further include a period of time that has elapsed with respect to a previous search result selection and a current time. The past search result selection activity 110 may also include a period of time over which a series of search result selections happen (e.g., singular selections will be counted less than a continuous interest in a document or site) and a duration of a search result selection (i.e., how long the user accesses the document after selecting it from the search results). Other types of search result selection activity may be tracked and used in ranking/re-ranking subsequent search results.

When the same user issues a search query to request another search from the search engine, the search engine may search a corpus of documents using the search query and identify a set of search results. The search engine may then rank the search results in a rank order 120 using existing ranking techniques. The ranking of the search results may then be adjusted 130 based on the user's past search result selection activity 110. A set of re-ranked search results 140 may then be provided to the user. In one implementation, the user's past search result selection activity 110 may be used in boosting selected search results within the set of search results to produce the re-ranked search results 140. In other implementations, the user's past search result selection activity 110 may be used as an input to a ranking algorithm during the initial ranking of the search results to produce the ranked search results 120.

Exemplary Network Configuration

Figure 2:
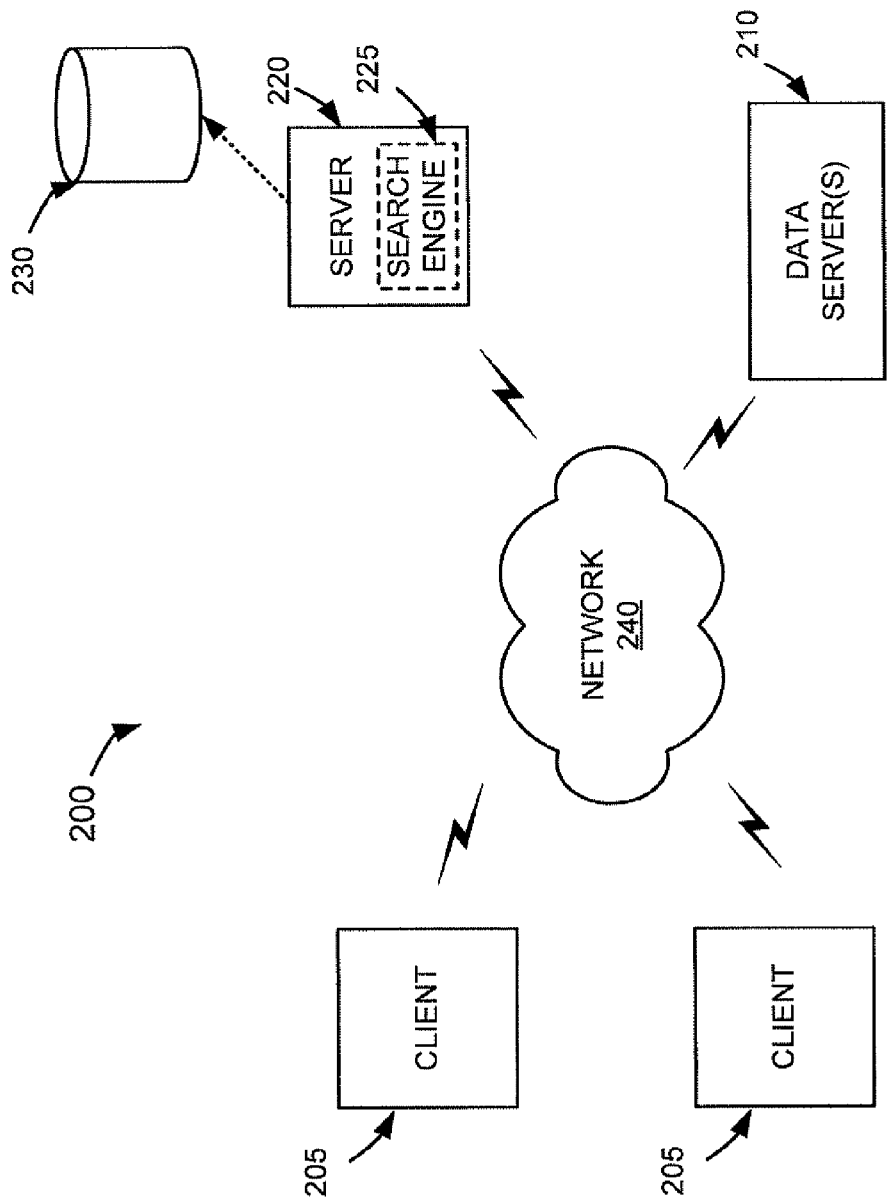
FIG. 2 is an exemplary diagram of a network in which systems and methods described herein may be implemented.

FIG. 2 is an exemplary diagram of a network 200 in which systems and methods described herein may be implemented. Network 200 may include multiple clients 205 connected to one or more servers 210 or 220 via a network 240. Two clients 205 and servers 210 and 220 have been illustrated as connected to network 240 for simplicity. In practice, there may be more or fewer clients and servers. Also, in some instances, a client may perform one or more functions of a server and a server may perform one or more functions of a client.

Clients 205 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored at servers 210 or 220.

Server 220 may include a server entity that accesses, fetches, aggregates, processes, searches, and/or maintains documents. Server 220 may implement a data aggregation service by crawling a corpus of documents (e.g., web pages) hosted on data server(s) 210, indexing the documents, and storing information associated with these documents in a repository of crawled documents. The aggregation service may be implemented in other ways, such as by agreement with the operator(s) of data server(s) 210 to distribute their documents via the data aggregation service.

In accordance with one implementation, server 220 may include a search engine 225 usable by users at clients 205. Search engine 225 may execute a search using a query, received from a user at a client 205, on the corpus of documents stored in the repository of crawled documents. Server 220 may provide, to a user issuing a query, a ranked list of documents related to the issued query. Server 220 may also track and store search result selection activity of user's at clients 205 in database 230. The stored search result selection activity may be indexed in database 230, for example, by an identifier associated with the user who performed the search result selection activity, thus, permitting subsequent retrieval of search result selection activity on a user basis. The stored search result selection activity of a given user may be subsequently retrieved for use in adjusting the ranking of subsequent search results provided to that user, as described further below.

Data server(s) 210 may store or maintain documents that may be crawled by server 220. Such documents may include data related to published news stories, products, images, user groups, geographic areas, or any other type of data. For example, server(s) 210 may store or maintain news stories from any type of news source, such as, for example, the Washington Post, the New York Times, Time magazine, or Newsweek. As another example, server(s) 210 may store or maintain data related to specific products, such as product data provided by one or more product manufacturers. As yet another example, server(s) 210 may store or maintain data related to other types of web documents, such as pages of web sites.

While servers 210 and 220 are shown as separate entities, it may be possible for one of servers 210 or 220 to perform one or more of the functions of the other one of servers 210 or 220. For example, it may be possible that servers 210 and 220 are implemented as a single server. It may also be possible for a single one of servers 210 and 220 to be implemented as two or more separate (and possibly distributed) devices.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network. Clients 205 and servers 210 and 220 may connect to network 240 via wired, wireless, and/or optical connections.

Exemplary Client/Server Architecture

Figure 3:
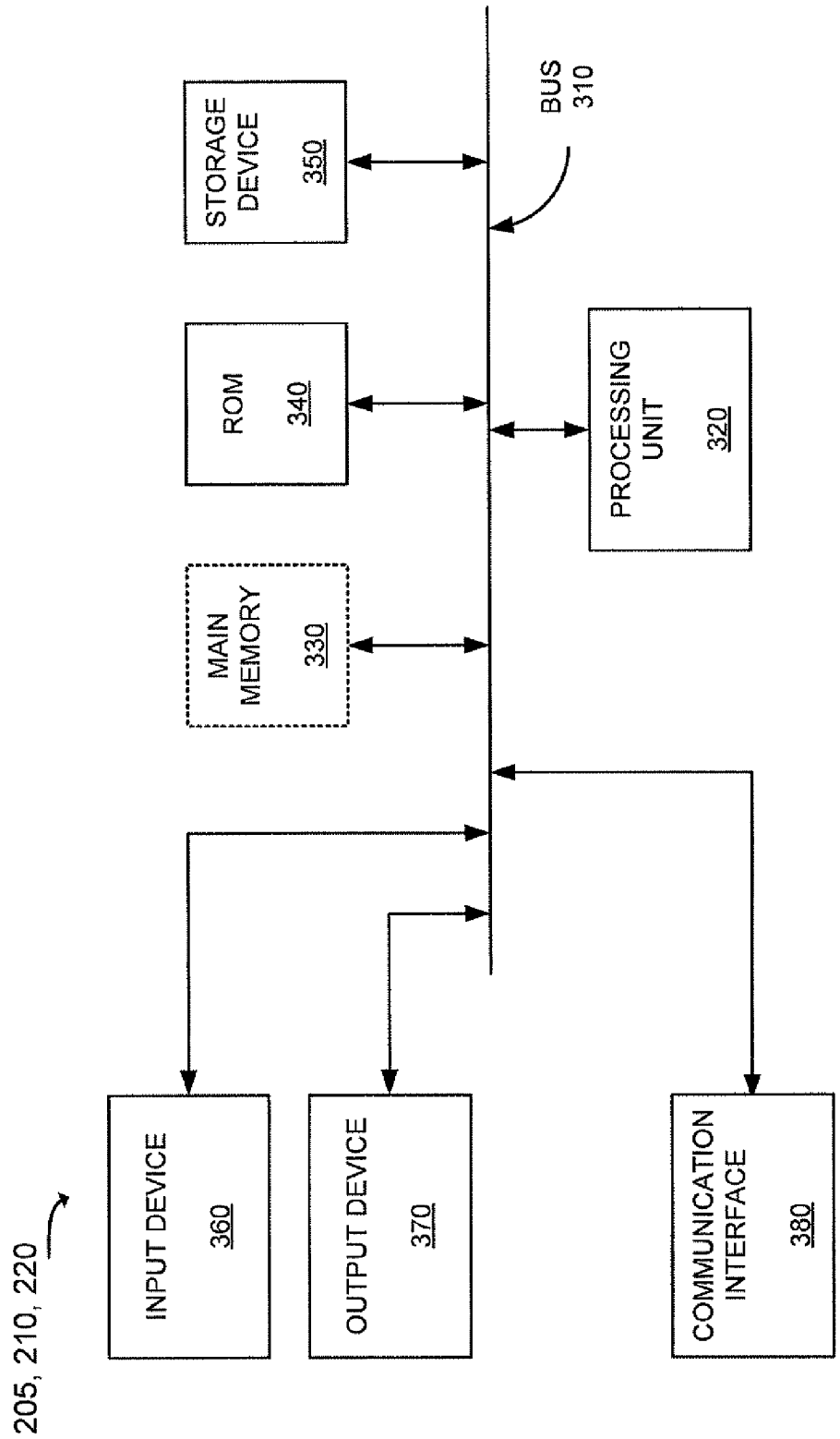
FIG. 3 is an exemplary diagram of a client or server of FIG. 2.

FIG. 3 is an exemplary diagram of a client or server entity (hereinafter called "client/server entity") which may correspond to one or more of clients 205 and/or servers 210 or 220. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes described herein. Thus, implementations described herein are not limited to any specific combination of hardware circuitry and software.

Exemplary Process for Personalizing Search Result Ranking

Figure 4:
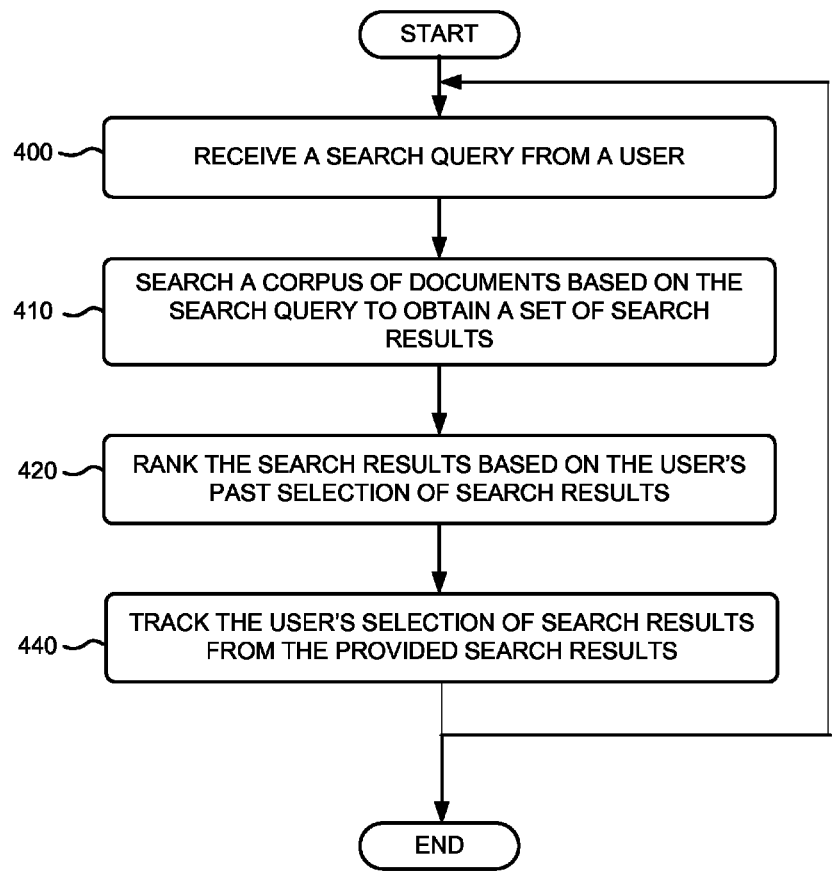
FIG. 4 is a flowchart of an exemplary process for personalized search result ranking.

FIG. 4 is a flowchart of an exemplary process for personalizing search result ranking based on a given user's previous search result selection activity. The process exemplified by FIG. 4 may be performed by server 220.

Figure 5:
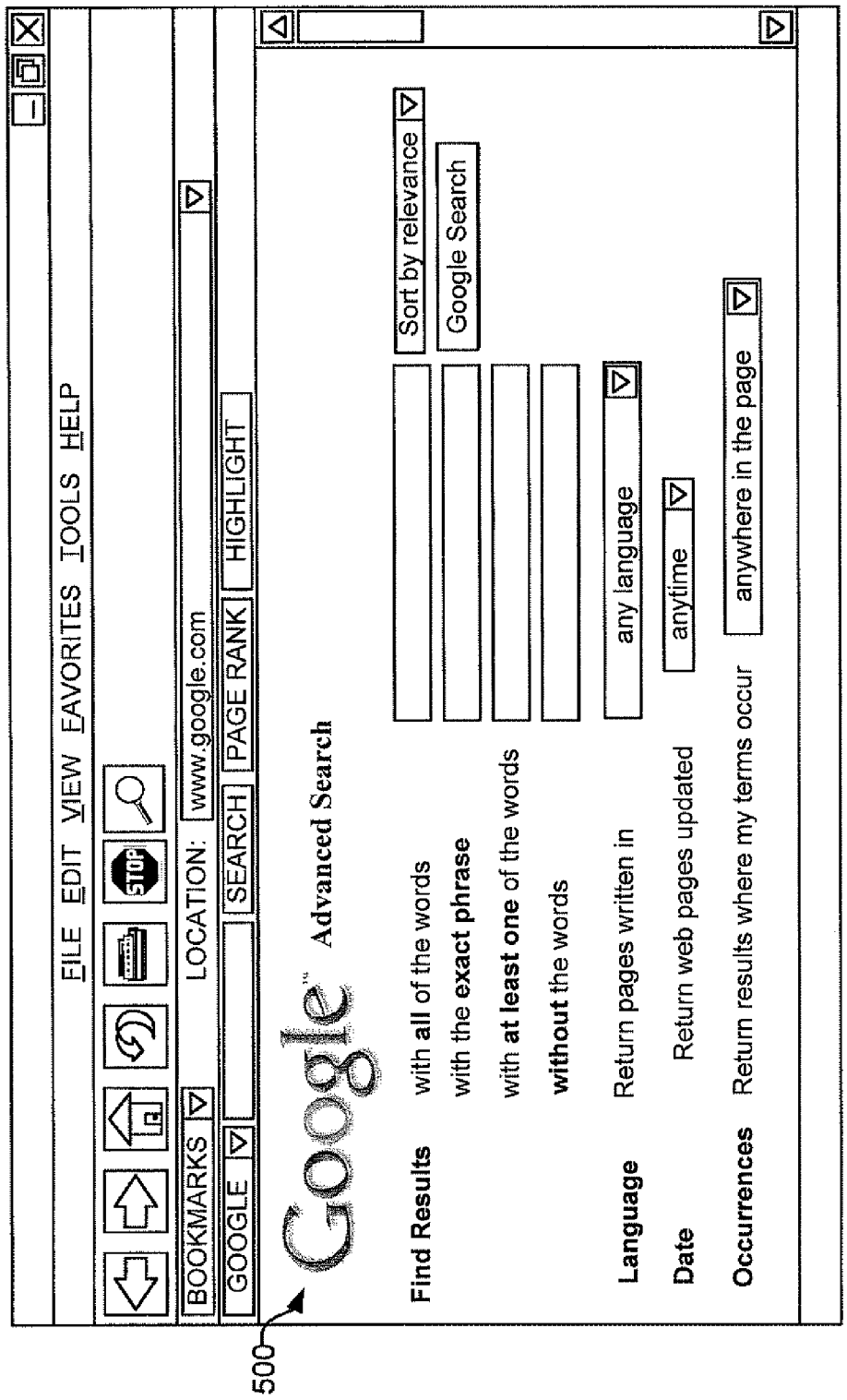
FIG. 5 illustrates an exemplary search engine interface for user entry of a search query at a client for issuance to a search engine.

The exemplary process may begin with the receipt of a search query from a user (block 400). FIG. 5 illustrates an exemplary search engine interface 500 for user entry of a search query at a client for issuance to a search engine. The user may enter a search query in search engine interface 500 at a client 205 and client 205 may send the search query to search engine 225 via network 240.

A corpus of documents may then be searched based on the search query to obtain a set of search results (block 410). For example, search engine 225 may receive the search query from the user and execute a search, using existing searching techniques, of the corpus of documents stored in the repository of crawled documents. The search may result in a set of search result documents, each document of which includes content that matches one or more terms of the search query.

The search results may be ranked based on the user's past selection of search results (block 420). The user's past search result activity (see block 440 below) may be tracked by server 220 and may be used in the process of ranking the set of search results in a rank order. The user's past search result activity may, for example, be used to boost selected results contained in the set of search results. Thus, in this implementation, the user's past search result selection activity may be used to re-rank the results of the set of search results by boosting one or more results contained in the set of search results. The user's past search results activity may, in other implementations, be used as one input into an existing ranking algorithm used to rank the search results among one another. In further implementations, the search results may be ranked using an existing ranking algorithm in a first rank order, and the search result ranking may be adjusted based on the user's past search result selection activity to rank the search results in a second rank order.

Examples of past search result selection activity that may be tracked and used in ranking search results includes, but is not limited to, the following:

a) a number of times a user selected a specific document, or any document associated with a specific site;

b) a period of time that has elapsed from a search result selection to a current time;

c) a period of time over which a series of search result selections happen (e.g., singular selections may be counted less than a continuous interest in a document or site); and/or d) a duration of a search result selection (i.e., how long the user accesses the document after selecting it from the search results). [

Figure 6:
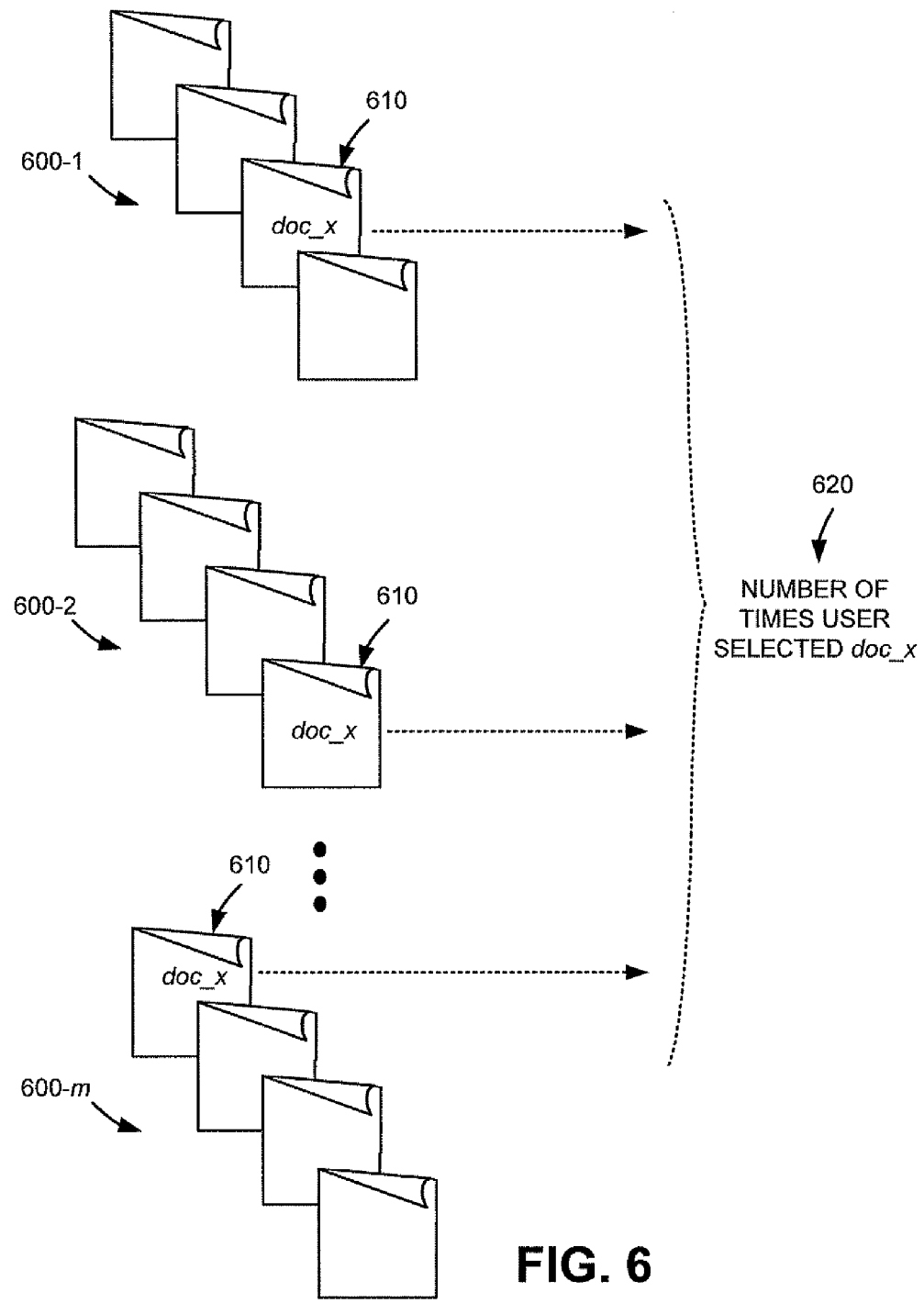
FIGS. 6-9 illustrate exemplary user search result selection activities that may be tracked in the exemplary process of FIG. 4.

FIG. 6 graphically illustrates one example of the tracking of a user's search result selection activity that includes a number of times the user selected a given search result. As shown in FIG. 6, a user may be provided with multiple sets of search results 600-1 through 600-*m* (during a single search session, or over multiple different search sessions) each of which may include document doc_x 610. As shown, doc_x 610 is selected by the user from each set of search results 600. The number of times 620 the user selected doc_x from the search results 600-1 through 600-*m* may be tracked. If the number of times 620 the user selected doc_x 610 is sufficiently high (e.g., greater than a specified threshold value), then the rank of doc_x 610 may be boosted among the ranked search results (e.g., moved higher in the list of search results) when it is included in subsequent search results provided to the user.

Figure 7:
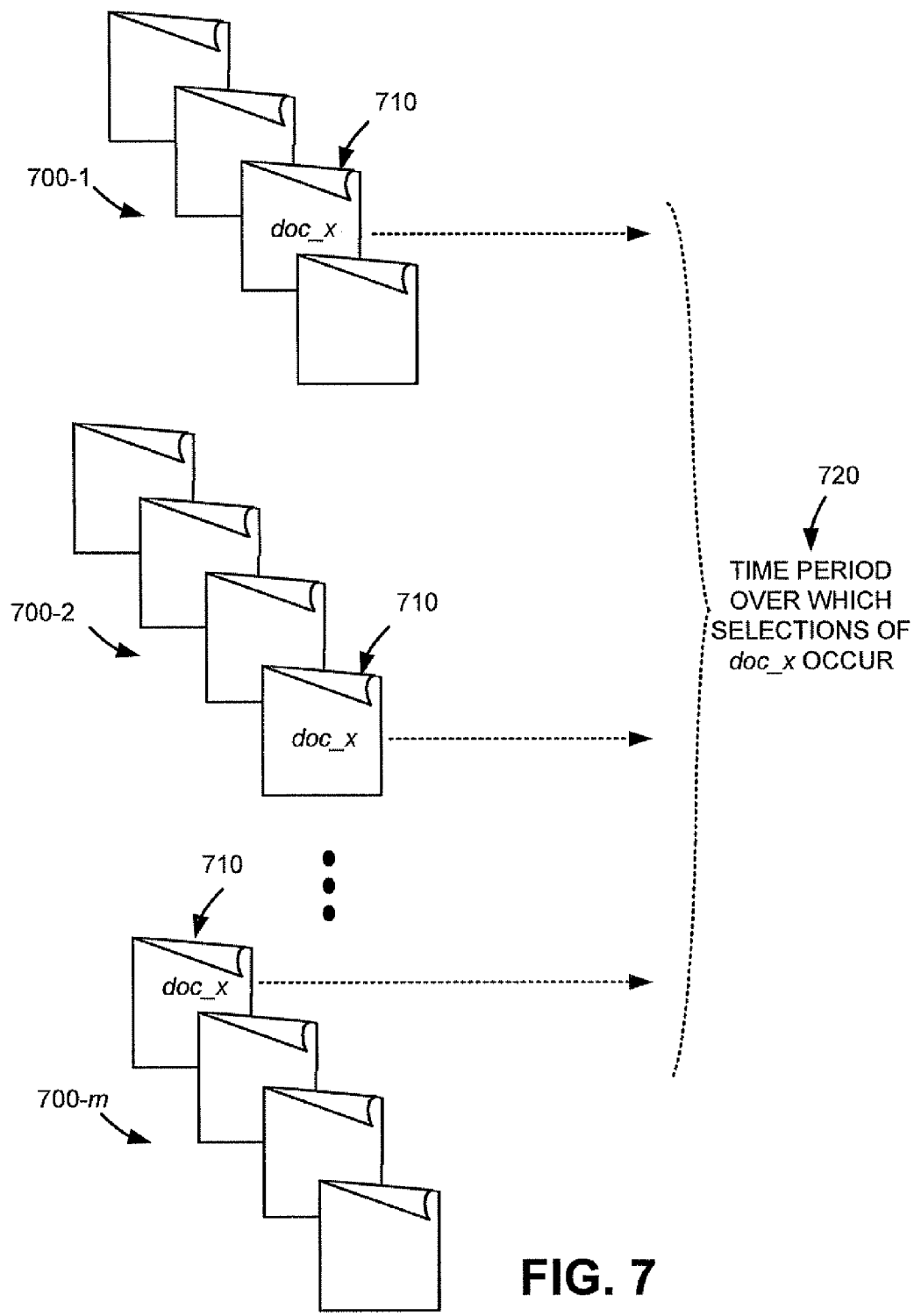

FIG. 7 graphically illustrates another example of the tracking of a user's search result selection activity that includes a time period over which multiple selections of a given search result occurred. As shown in FIG. 7, a user may be provided with multiple sets of search results 700-1 through 700-*m* (during a single search session, or over multiple different search sessions), each of which may include document doc_x 710. As shown, doc_x 710 is selected by the user from each set of search results 700. A time period 720 over which the selections of doc_x 710 occur may be tracked. If the time period 720 over which the selections of doc_x 710 occur is relatively long, indicating continuous interest by user in doc_x, then the rank of doc_x 710 may be boosted among the ranked search results when it is included in subsequent search results provided to the user.

Figure 8:
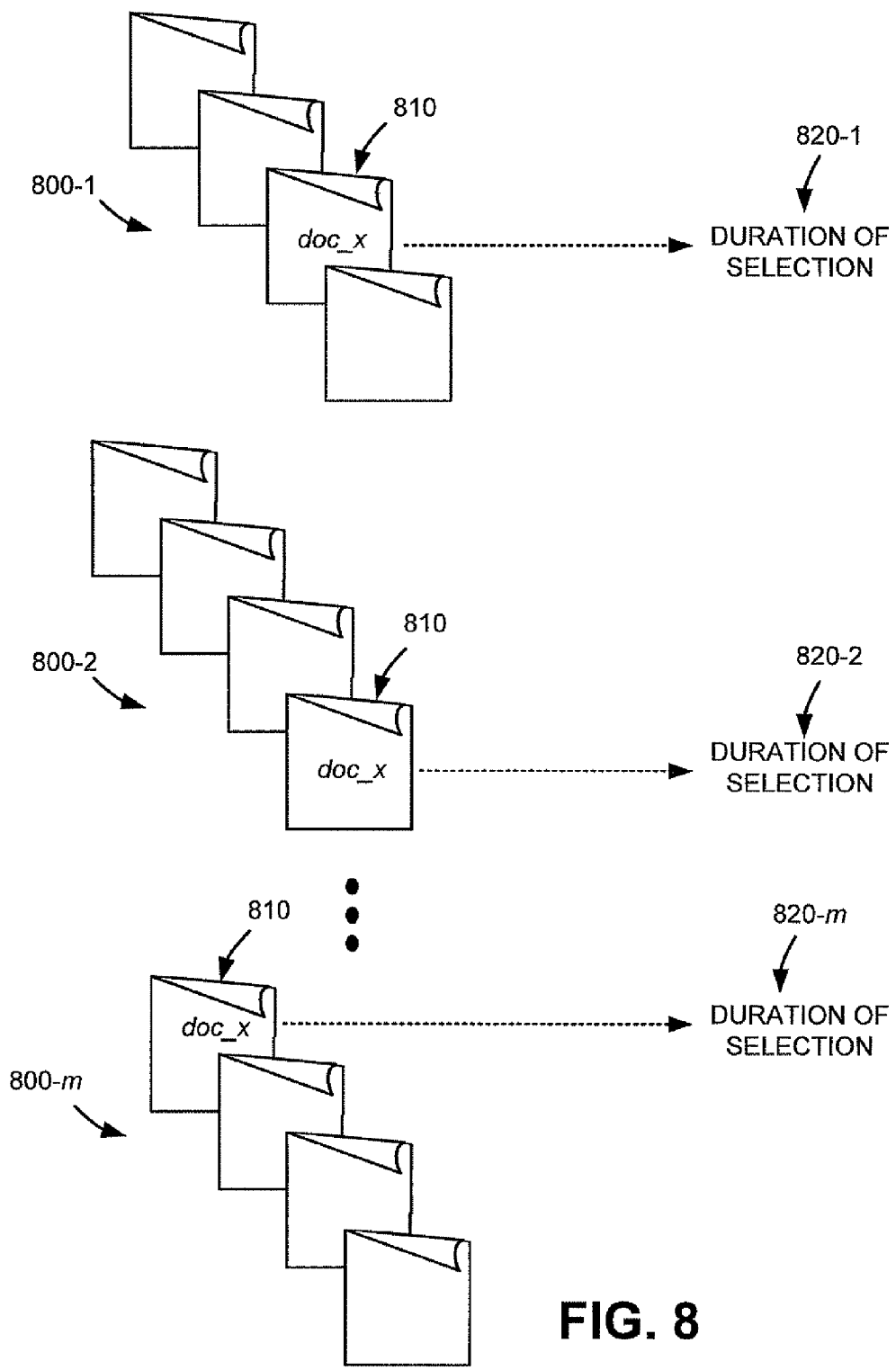

FIG. 8 graphically illustrates another example of the tracking of a user's search result selection activity that includes a duration of selection for each selected search result. As shown in FIG. 8, a user may be provided with multiple sets of search results 800-1 through 800-*m* (during a single search session, or over multiple different search sessions), each of which may include document doc_x 810. As shown, doc_x 810 is selected by the user from each set of search results 800. A duration of selection 820-1 through 820-*m* (e.g., a time period after selection of doc_x during which the user is accessing the document corresponding to the selected result), for each selection from a respective set of search results 800-1 through 800-*m*, may be tracked. If the duration of selection 820-1 through 820-*m* for doc_x 810 is relatively high (e.g., longer than an average search result selection for the user or greater than a threshold), then the rank of doc_x 810 may be boosted among the ranked search results when it is included in subsequent search results provided to the user.

Figure 9:
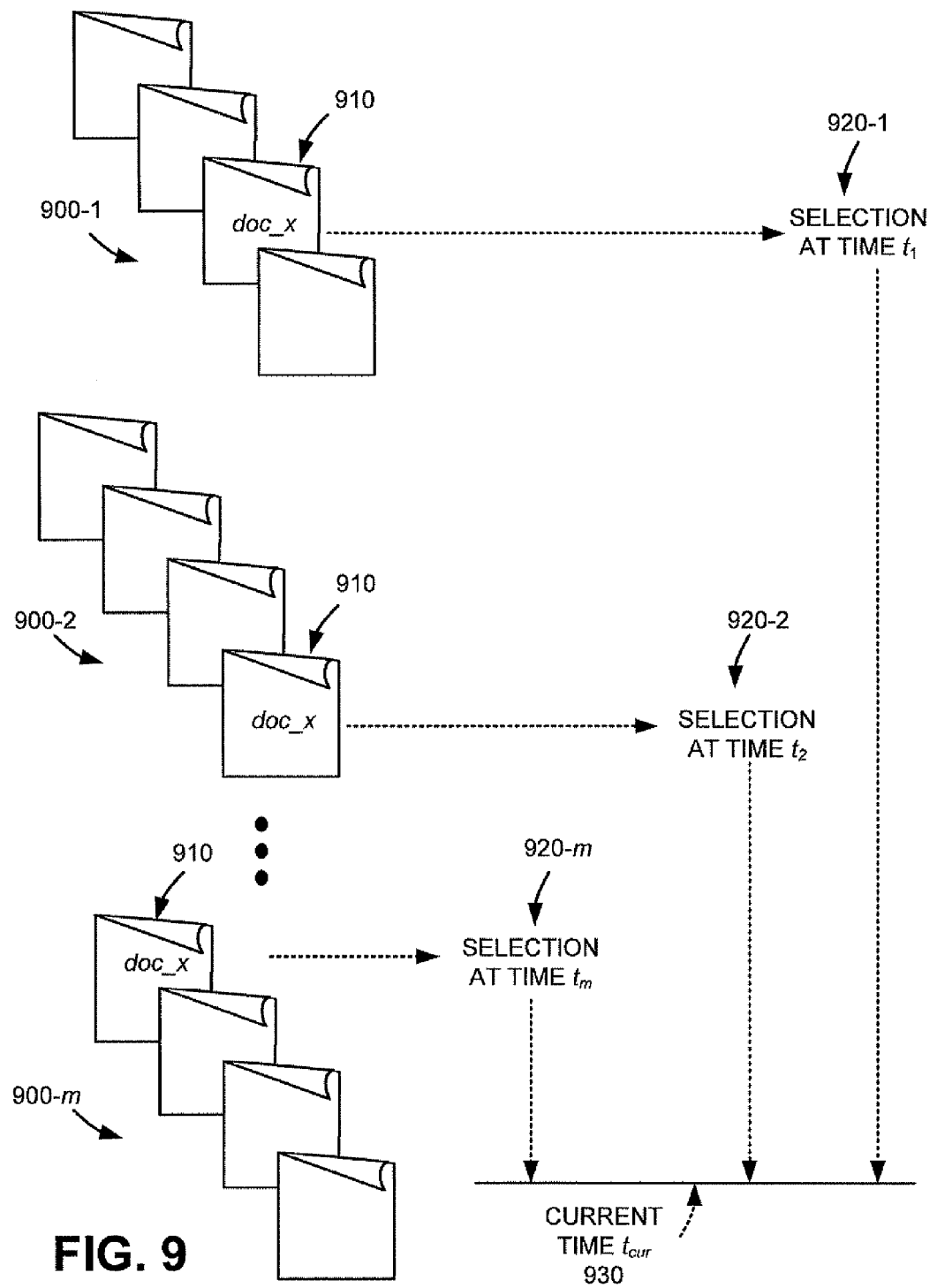

FIG. 9 graphically illustrates another example of the tracking of a user's search result selection activity that includes determining how long ago each search result selection occurred. As shown in FIG. 9, a user may be provided with multiple sets of search results 900-1 through 900-$m$ (during a single search session, or over multiple different search sessions), each of which may include document doc_x 910. As shown, doc_x 910 is selected by the user from each set of search results 900. A time t 920-1 through 920-$m$ at which each selection from a respective set of search results 800-1 through 800-$m$, may be tracked. Each time t 920-1 through 920-$m$ may be compared with a current time $t_{cur}$ 930 to determine how long ago each previous selection of doc_x occurred. If selection times 920-1 through 920-$m$ indicate that doc_x 910 has been selected by the user recently (e.g., within a predetermined time window), then the rank of doc_x 910 may be boosted among the ranked search results when it is included in subsequent search results provided to the user.

Figure 10:
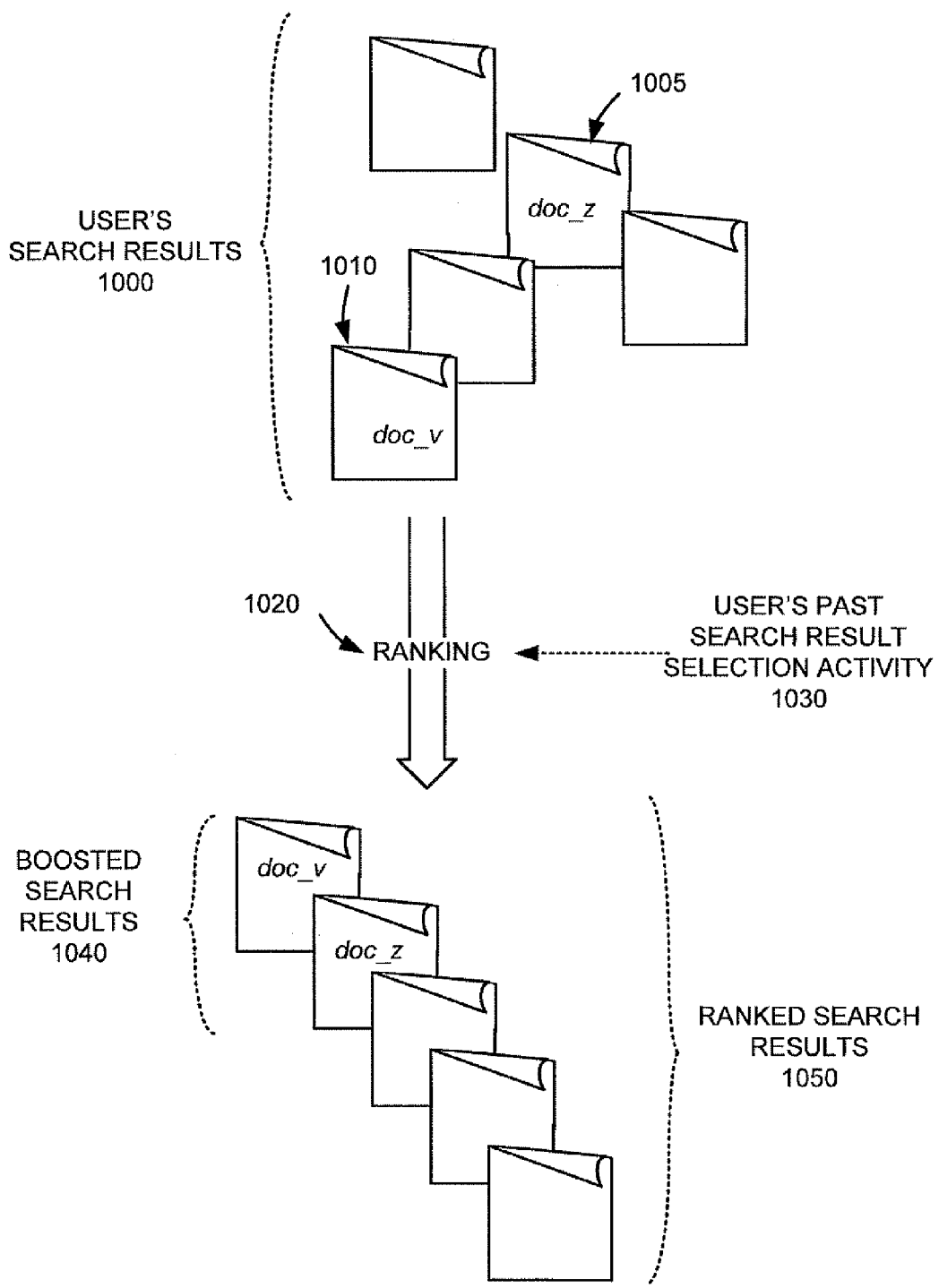
FIG. 10 graphically illustrates the personalized search result ranking performed in the exemplary process of FIG. 4.

FIG. 10 graphically depicts the personalized search result ranking of block 420 above. As shown in FIG. 10, a set of search results 1000 may result from a search of a corpus of documents executed by a search engine for a given user. The search results 1000 may include documents doc_z 1005 and doc_v 1010. The search results may then be ranked 1020 based on the user's past search result selection activity 1020. As shown in FIG. 10, the user's past search result selection activity 1020 may cause the ranks of documents doc_v and doc_z to be boosted higher (e.g., moved toward the top of the list) of the ranked search results 1050 that result from the ranking process 1030. For example, the user's past search result selection activity 1020 may indicate that the user "likes," has an interest in, or would find desirable documents doc_v and doc_z.

Figure 11:
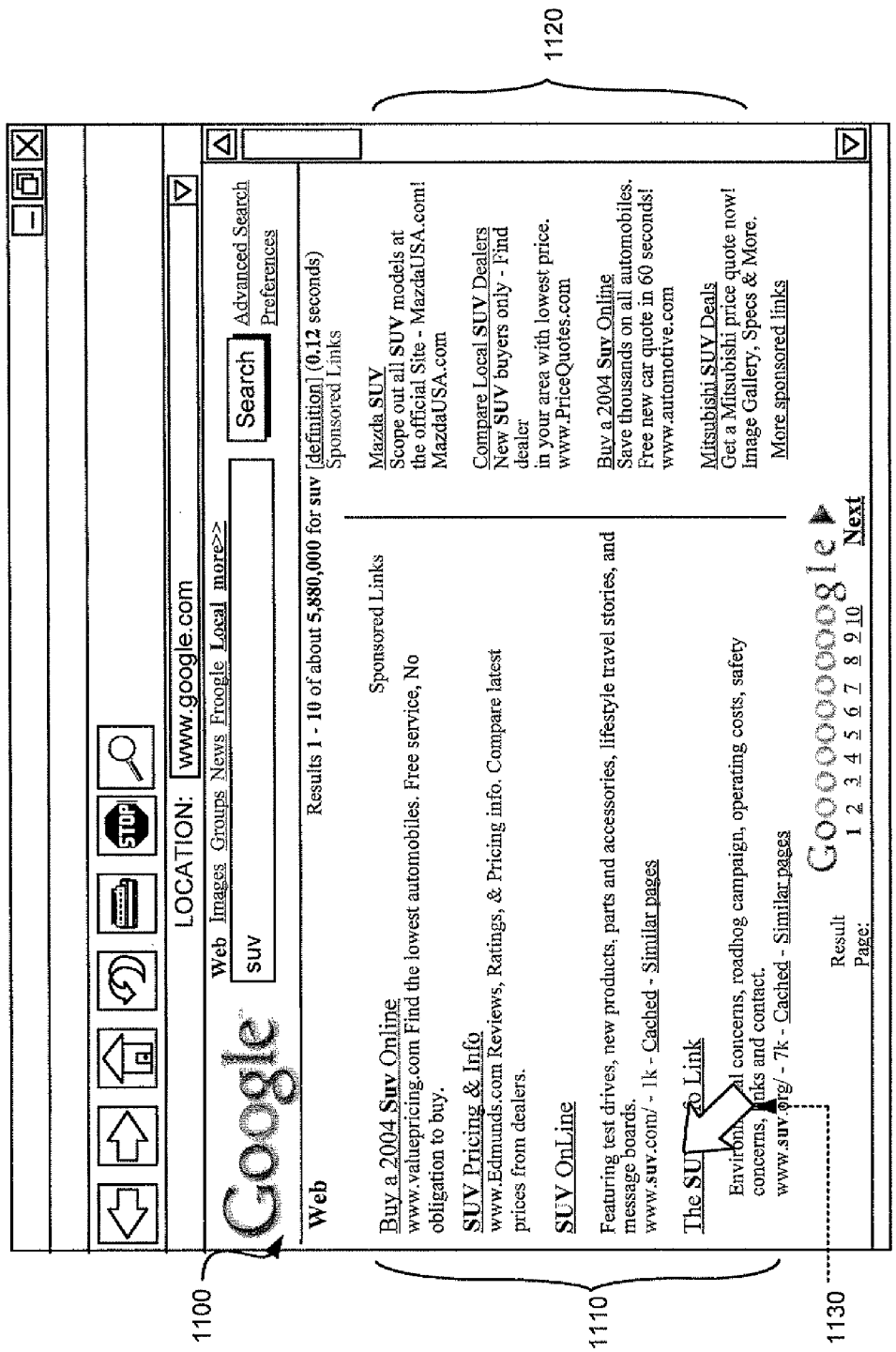
FIG. 11 depicts an exemplary document that provides ranked search results to a user.

The ranked search results may be provided to the user (block 430). For example, as shown in FIG. 11, a search result document 1100 that includes a list of search results 1110 in a ranked order and, possibly, a list of advertisements 1120 that also match the user's search query. The list of search results 1110 may, for example, include search results boosted toward the top of the search results list based on the user's past search result selection activity.

The user's selection of search results from the provided search results may be tracked (block 440). Search result selection activity, as described above with respect to block 420 and FIGS. 6-9, may be tracked for use in the subsequent ranking of search results provided to the same user. For example, as shown in FIG. 11, the user, after receiving search result document 1100 may select 1130 one or more results from the list of search results 1110 and this selection may be tracked. The user's search result selection activity may be tracked by a respective client 205 and then provided to server 220, or may be directly tracked by server 220 via recording of selections from search result document 1100. The exemplary process may, after tracking the user's search result activity for the current set of search results, return to block 400 for a subsequent search by the user.

Conclusion

Implementations described herein provide illustration and description, but is not intended to be exhaustive or to limit the invention to the precise form disclosed. Modifications and variations are possible in light of the above teachings, or may be acquired from practice of the invention. For example, while a series of acts has been described with regard to FIG. 4, the order of the acts may be modified in other implementations consistent with the principles of the invention. Further, non-dependent acts may be performed in parallel. Though the exemplary process of FIG. 4 has been described as being implemented by server 220, the exemplary process of FIG. 4 may alternatively be implemented by a client 205. In other implementations, the exemplary process of FIG. 4 may be implemented by server 220 in conjunction with a respective client 205.

Various examples of past search result selection activity, and their use in ranking search results, have been described above. Other types of past search result selection activity, and other factors not described above, may be used in ranking search results. For example, a ranking position of a previously selected search result may be used as a factor in ranking a current set of search results that includes that search result (e.g., a search result ranked #1 in a previous set of ranked search results may be boosted in a current set of search results differently than a search result ranked #9 in the previous set of ranked search results). As another example, information about other search result selections in a same previous search may be used as a factor in ranking current search results (e.g., a selection order may be used that takes into account whether a search result was selected first, second, third, etc.; a total number of selections from a given set of search results (e.g., a given search result may be boosted differently if it was the only result selected from a set of search results as opposed to being one of ten results selected)). As a further example, previously selected search results may be boosted for only the same (or related) queries that were used to generate the previous sets of search results from which the search results were selected. As an additional example, a current search result may be boosted (or possibly ranked downwards) based on how often the search result appeared in previous searches but was not selected. As a further example, search results may be boosted based on a temporal distribution of selections for the search results (e.g., use the average amount of time between a first selection of a result and a most recent selection of the result per user to provide an indication of short/long term the site/document is, use a duration over which a user has selected and is viewing a given search result prior to closing the search result or selecting another search result).

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
   supplying, by the server device, a first set of search results to a user,
      where a rank position of a particular one of the first set of search results is based on a rank score computed by a search engine;

tracking, by the server device, a quantity of accesses, by the user, of a first document,
  the first document being associated with a web site, and
  the first document being associated with a search result from the first set of search results;
obtaining, by the server device, a second set of search results, where
  the second set of search results is different from the first set of search results,
  the second set of search results includes at least one search result corresponding to a second document associated with the web site, and
  the second set of search results is in a ranked list;
adjusting, by the server device, a rank position of the at least one search result in the ranked list to form adjusted search results based on:
  the quantity of accesses satisfying a threshold quantity of accesses;
  another quantity of accesses, by the user, associated with the first set of search results,
    the other quantity of accesses being unassociated with the first document; and
  at least one of:
    an order in which the other quantity of accesses occurred relative to the quantity of accesses of the first document, or
    a comparison of a first amount of time, spent by the user, when accessing the first document, and a second amount of time, spent by the user, when accessing documents associated with the other quantity of accesses; and
providing, by the server device and for presentation, the adjusted search results.

2. The method of claim 1, further comprising:
supplying a plurality of sets of search results to the user; and
identifying how often the at least one search result was included in the plurality of sets of search results but was not selected by the user; and
when adjusting the rank position of the at least one search result, the method further includes:
  adjusting the rank position of the at least one search result based on how often the at least one search result was included in the plurality of sets of search results but was not selected by the user.

3. The method of claim 1, where adjusting the rank position of the at least one search result further comprises:
boosting selected search results of the second set of search results in the ranked list based on the quantity of accesses.

4. The method of claim 1, where adjusting the rank position of the at least one search result further comprises:
ranking the second set of search results in a first rank position order; and
re-ranking the second set of search results in a second rank position order based on the quantity of accesses.

5. The method of claim 1, further comprising:
tracking a period of time over which the quantity of accesses occur,
where, when adjusting the rank position of the at least one search result, the method further includes:
  adjusting the rank position of the at least one search result based on the period of time.

6. The method of claim 1, further comprising:
receiving a first search query from the user; and
searching a corpus of documents, based on the first search query, to obtain the first set of search results.

7. The method of claim 6, further comprising:
receiving a second search query from the user,
where obtaining the second set of search results comprises:
  searching the corpus of documents, based on the second search query, to obtain the second set of search results.

8. The method of claim 1, further comprising:
tracking a duration of time of each access of the quantity of accesses,
where, when adjusting the rank position of the at least one search result, the method further includes:
  adjusting the rank position of the at least one search result based on the duration of time.

9. One or more server devices comprising:
a memory to store instructions; and
a processor to execute the instructions to:
  provide a first set of search results to a user,
    where a rank position of a particular one of the first set of search results is based on a rank score computed by a search engine;
  track a quantity of accesses, by the user, of a first document,
    the first document being associated with a web site, and
    the first document being associated with a search result from the first set of search results;
  provide a second set of search results to the user, where
    the second set of search results is different from the first set of search results,
    the second set of search results includes at least one search result corresponding to a second document associated with the web site, and
    the second set of search results is in a ranked list; and
  adjust a rank position of the at least one search result in the ranked list to form adjusted search results based on:
    the quantity of accesses;
    another quantity of accesses, by the user, associated with the first set of search results,
      the other quantity of accesses being unassociated with the first document; and
    at least one of:
      an order in which the other quantity of accesses occurred relative to the quantity of accesses of the first document, or
      a comparison of a first amount of time, spent by the user, when accessing the first document, and a second amount of time, spent by the user, when accessing documents associated with the other quantity of accesses; and
  provide, for presentation, the adjusted search results.

10. The one or more server devices of claim 9, where the processor, when adjusting the rank position of the at least one search result, is further to:
adjust the rank position of the at least one search result based on a period of time that has elapsed from a particular access, of the quantity of accesses, of the first document to a current time.

11. The one or more server devices of claim 9, where the processor, when adjusting the rank position of the at least one search result, is further to:
adjust the rank position of the at least one search result based on how long the user accessed the at least one search result.

12. The one or more server devices of claim 9, where the processor is further to:
  receive a first search query from the user;
  search a corpus of documents, based on the first search query, to obtain the first set of search results; and
  receive a second search query from the user,
  where the processor, when providing the second set of search results, is further to:
    search the corpus of documents, based on the second search query, to provide the second set of search results.

13. A system comprising:
  one or more devices to:
    provide a first set of search results to a user,
      where a rank position of a particular one of the first set of search results is based on a rank score computed by a search engine;
    store information
      identifying a quantity of accesses, by the user, of a first document, the first document being associated with a web site, and the first document being associated with a search result from the first set of search results;
    provide, to the user, a second set of search results, where
      the second set of search results is different from the first set of search results,
      the second set of search results includes at least one search result corresponding to a second document associated with the web site, and
      the second set of search results is arranged in a ranked list;
    adjust a rank position of the at least one search result in the ranked list to form adjusted search results based on:
      the quantity of accesses;
      another quantity of accesses, by the user, associated with the first set of search results,
        the other quantity of accesses being unassociated with the first document; and
      at least one of:
        an order in which the other quantity of accesses occurred relative to the quantity of accesses of the first document, or
        a comparison of a first amount of time, spent by the user, when accessing the first document, and a second amount of time, spent by the user, when accessing documents associated with the other quantity of accesses; and
    provide, for presentation, the adjusted search results.

14. The system of claim 13, where the one or more devices, when adjusting the rank position of the at least one search result, are further to:
  adjust the rank position of the at least one search result in the ranked list based on an order in which the first document was selected, among other selections, by the user in the first set of search results.

15. The system of claim 13, where the one or more devices, when adjusting the rank position of the at least one search result, are further to:
  adjust the rank position of the at least one search result in the ranked list based on a period of time from a time a particular access, of the quantity of accesses, of the first document to a current time.

16. The system of claim 13, where the one or more devices are further to:
  receive a first search query from the user;
  search a corpus of documents, based on the first search query, to obtain the first set of search results; and
  receive a second search query from the user,
  where the one or more devices, when providing the second set of search results, are further to:
    search the corpus of documents, based on the second search query, to provide the second set of search results.

17. A non-transitory computer-readable medium storing instructions, the instructions comprising:
  one or more instructions which, when executed by a processor, cause the processor to:
    provide a first set of search results to a user
    information identifying a quantity of accesses, by the user, of a first document,
      the first document being associated with a web site, and
      the first document being associated with a search result from the first set of search results;
    obtain a second set of search results, where the second set of search results is different from the first set of search results,
      the second set of search results includes at least one search result corresponding to a second document associated with the web site, and
      the second set of search results is arranged in a ranked list; and
    adjust a rank position of the at least one search result in the ranked list to form adjusted search results based on:
      the quantity of accesses;
      another quantity of accesses, by the user, associated with the first set of search results,
        the other quantity of accesses being unassociated with the first document; and
      at least one of:
        an order in which the other quantity of accesses occurred relative to the quantity of accesses of the first document, or
        a comparison of a first amount of time, spent by the user, when accessing the first document, and a second amount of time, spent by the user, when accessing documents associated with the other quantity of accesses; and
    provide, for presentation, the adjusted search results.

18. The medium of claim 17, where the instructions further include:
  one or more instructions to provide the first set of search results based on a first search query and
  one or more instructions to provide the second set of search results based on a second query,
    where the second query is not the same as the first query.

19. The medium of claim 18, where the one or more instructions to adjust the rank position of the at least one search result further include:
  one or more instructions to adjust the rank position of the at least one search result only if the second query is related to the first query.

20. The medium of claim 17, where the instructions further include:
  one or more instructions to receive a first search query from the user;

one or more instructions to search a corpus of documents, based on the first search query, to obtain the first set of search results; and
one or more instructions to receive a second search query from the user,
where the one or more instructions to obtain the second set of search results include:
one or more instructions to search the corpus of documents, based on the second search query, to obtain the second set of search results.

* * * * *